April 20, 1965  C. VAN DER LELY ETAL  3,179,421
DEVICES FOR SPREADING GRANULAR OR POWDERY MATERIAL
Original Filed Oct. 21, 1959  3 Sheets-Sheet 2

INVENTORS
CORNELIS VAN DER LELY
ARY VAN DER LELY
BY
Mason, Mason & Allbright
Attorneys April 20, 1965 C. VAN DER LELY ETAL 3,179,421
DEVICES FOR SPREADING GRANULAR OR POWDERY MATERIAL
Original Filed Oct. 21, 1959 3 Sheets-Sheet 3

INVENTORS
CORNELIS VAN DER LELY
ARY VAN DER LELY
BY
Mason, Mason & Albright
Attorneys

United States Patent Office 3,179,421
Patented Apr. 20, 1965

3,179,421
DEVICES FOR SPREADING GRANULAR OR POWDERY MATERIAL
Cornelis van der Lely, Zug, Switzerland, and Ary van der Lely, Maasland, Netherlands, assignors to Van der Lely, C.N.V., Maasland, Netherlands, a Dutch limited company of the Netherlands
Original application Oct. 21, 1959, Ser. No. 847,845, now Patent No. 3,063,724, dated Nov. 13, 1962. Divided and this application Nov. 9, 1962, Ser. No. 236,491
4 Claims. (Cl. 275—15)

This invention relates to devices for spreading granular or powdery material, of the kind comprising a container for the material and a frame. This application is a division of application S.N. 847,845, filed October 21, 1959 and now Patent No. 3,063,724 issued November 13, 1962.

It is an object of the invention to provide a device of the kind set forth, which will be effective in using and which is simple in construction.

In accordance with the invention, there is provided a device of the kind set forth, the upper part being detachable from the lower part, the lower part being flexedly connected to the frame, a material spreader being provided near the lower part of the frame to receive material from the container through outlet ports in the said lower part. By thus making the upper part detachable from the lower part the device can be readily cleaned.

Figure 1:
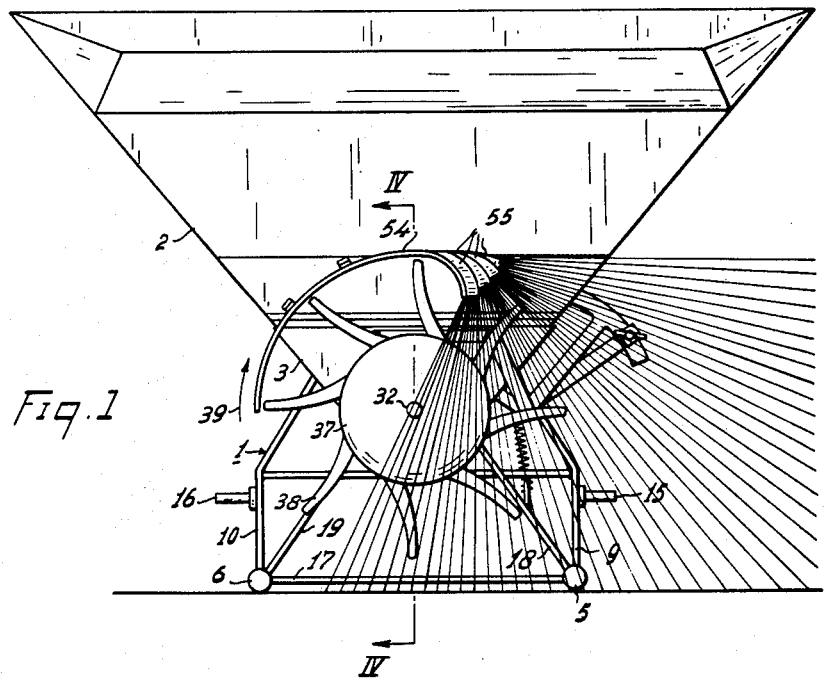
Figure 6:
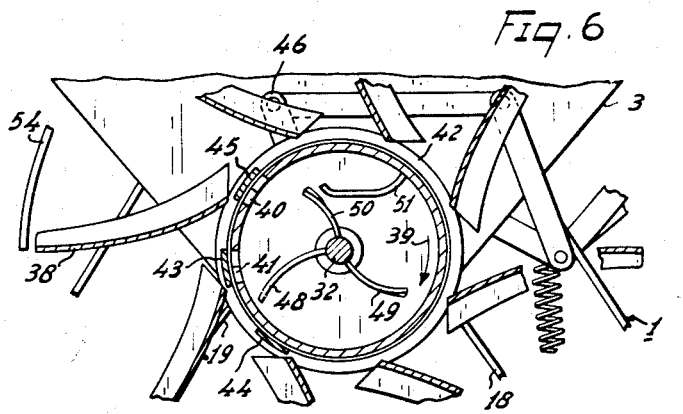
Figure 2:
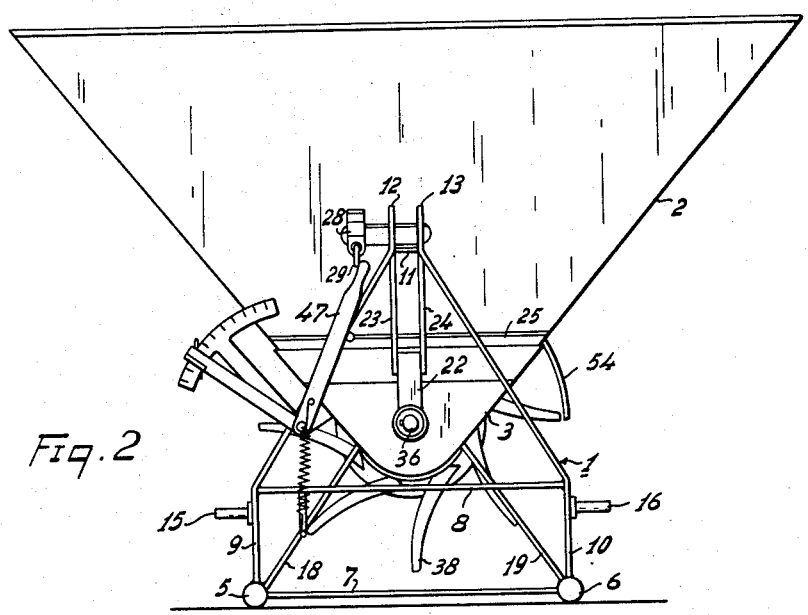
Figure 3:
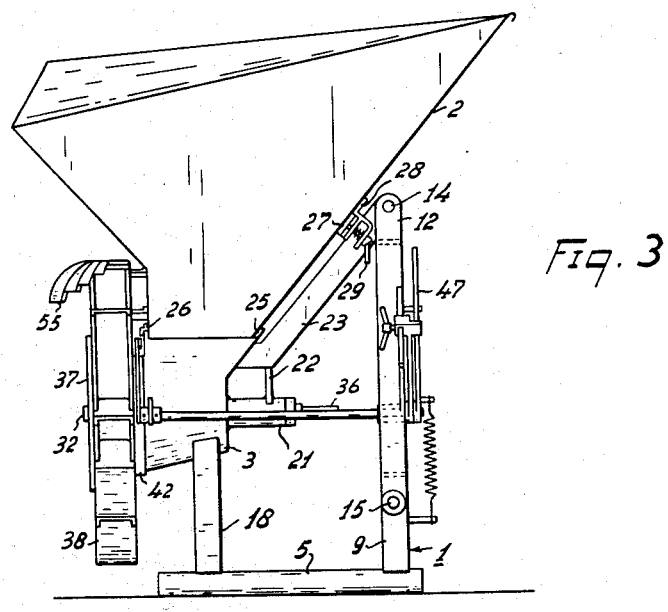
Figure 4:
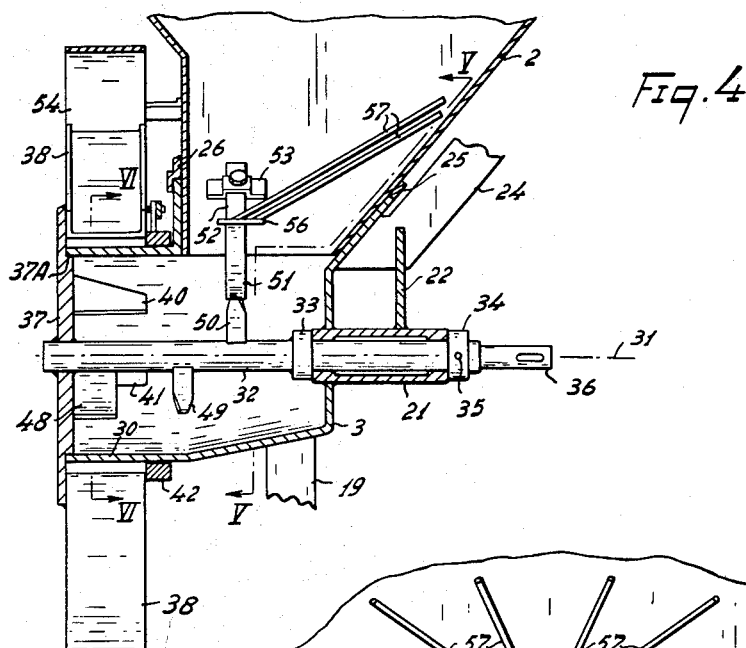
Figure 5:
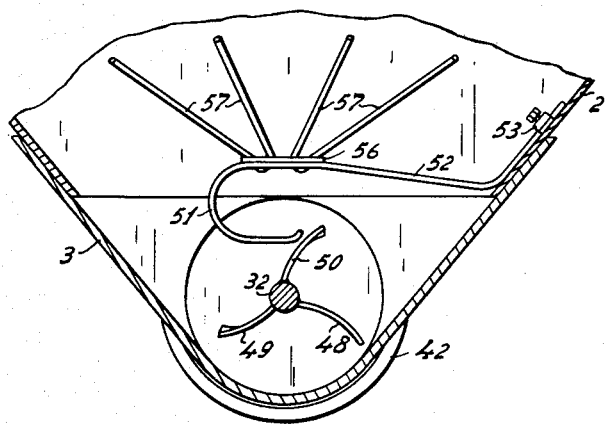

For a better understanding of the invention and to show how the same may be carried into effect, reference will now be made by way of example to the accompanying drawings in which:

FIGURE 1 is a rear elevation of a device for spreading granular or powdery material in accordance with the invention, FIGURE 2 is a front elevation corresponding to FIGURE 1, FIGURE 3 is a side view of the same device, FIGURE 4 is a part-sectional view taken on the line IV—IV of FIGURE 1 but to an enlarged scale, FIGURE 5 is a sectional view taken on the line V—V of FIGURE 4, FIGURE 6 is a section taken on the line VI—VI of FIGURE 4. Referring first to the drawings, there is shown a device for spreading granular or powdery material which includes a frame generally indicated at 1. In a manner which will be explained, the frame rigidly supports the lower, tough-like, part 3 of a container for the material to be spread. The container has an upper part 2 which is made removable from the part 3 and which constitutes an extension of the side walls of the lower part 3. The illustrated device is intended to be mounted upon the threepoint power hoist of a tractor. In FIGURES 1, 2 and 3 the device is shown resting upon the ground and not mounted on the tractor power hoist. The base of the frame is constituted by a pair of parallel runners 5 and 6. At the front ends of the runners 5 and 6 there is a frame work (see FIGURE 2) comprising horizontal frame members 7 and 8 and upright frame members 9 and 10. Above the level of the frame member 8, the upright frame members 9 and 10 converge towards one another to a location where they are joined by a short frame element 11. The frame members 9 and 10 are prolonged above the frame element 11 by parallel portions 12 and 13, these portions together with the element 11 constituting a U-shaped bracket. The portions 12 and 13 are formed with holes which are aligned, one of such holes being indicated at 14 in FIGURE 3. The U-shaped bracket is adapted to receive the upper link of the threepoint hoist of a tractor, such link being held in the bracket with the aid of a pin (now shown) which is entered in the aligned holes in the bracket. Pins 15 and 16 are arranged to project from the lower parts of the frame members 9 and 10, these pins being intended to receive the ends of the two lower lift links of the tractor power hoist.

At the rear end of the runners 5 and 6 there is a frame work consisting of a horizontal frame member 17 (see FIGURE 1) and two upwardly converging members 18 and 19. As can be seen best from FIGURES 2 and 3, the upper ends of the frame members 19 and 18 are secured to the exterior of the fixed container part 3. The front end of the latter has fixedly mounted therein a sleeve 21, to the exterior of which there is secured an upstanding plate 22. There are two further frame members 23 and 24, which are at their lower ends secured to the front side of the container part 3. As will be seen from FIGURE 3, the frame members 23 and 24 incline forwardly from their places of attachment to the container part 3, the upper ends of these frame members being joined to the portions 12 and 13 which constitute the previously described U-shaped bracket. The plate 22 is entered between the frame members 23 and 24, and is fixed thereto. Hence the sleeve 21 is supported in two places along its length.

As previously indicated, the upper part 2 of the container is removably attached to the lower part 3 thereof. As seen best in FIGURE 4 the front and rear walls of the upper part 2 extend within the corresponding walls of the lower container part 3. A bar 25 is secured on the exterior of the front wall of the upper part 2, the bar abutting against the upper edge of the corresponding wall of the lower part 3. The rear wall of the upper part 2 has a recessed strip 26 attached thereto, this strip likewise abutting the corresponding upper edge of the wall of the lower part, and moreover engaging over the side of such edge. It will be appreciated that the upper part 2 can be withdrawn from the lower part 3 of the container, simply by lifting the upper part 3 therefrom. To prevent unintentional withdrawal of the upper container part 2, a releasable locking means is provided. Such locking means can be seen in FIGURES 2 and 3 and it will be noted that the frame members 23 and 24 have a finger 27, secured thereto and extending laterally therefrom. A bracket 28 is fixed to the front wall of the upper containing part 2, the bracket having mounted therein a pin 29. A spring is associated with the pin and tends to urge the same to a position where it enters a hole formed in the finger 27. The pin 29 can be manually displaced against the action of the spring so as to withdraw the pin from the hole in the finger 27. With the pin in the withdrawn position, the upper container part can be removed, but so long as the pin is entered in the hole in the finger such part is locked in position.

The lower container part 3, as seen best from FIGURE 4, is of trough-like form at its forward end, the mouth of the trough being defined by upwardly extending walls which are further upwardly extended by the upper container part 2. The part 3 has a rearward cylindrical extension 30, the axis 31 of which is horizontal and coincident with the axis of the sleeve 21. A shaft 32 is mounted for rotation in the sleeve 21, the latter constituting a journal bearing. The shaft has a fixed collar 33 and a removable collar 34 held in position by a pin 35. The forward end 36 of the shaft is adapted for directly connecting to the power take-off shaft of a tractor. The rear end of the shaft 36 has a disc 37 secured thereto. The disc 37 is formed with an annular shoulder 37A which fits in the otherwise open mouth of the cylindrical portion 30, beyond the shoulder 37A. The disc 37 is of reduced thickness and has secured to it a plurality of ejector blades 38. Each such blade 38 is made from channel section material. The disc 37 is intended to be turned with the aid of the shaft 12 in the direction indicated by the arrow 39 in FIGURE 1. It will be noted that each of the ejector blades is non radial with respect to the axis 31 so that the outer end or tip of a blade lags behind the inner end or root thereof. The blades are, however, bent forwardly with respect to their intended direction of motion. The root ends of all the blades are located so as to sweep over the curved external surface of the cylindrical portion 30. There are two apertures 40 and 41 formed in the portion 30 (see FIGURES 4 and 6), the extent of each aperture in a direction axially of the shaft 32, being about equal to the width of the ejector blades at their root ends. A ring 42 is mounted upon the cylindrical portion 30 so as to be adjustably turnable thereon. The ring carries three curved shutter plates 43, 44 and 45. These plates extend into the annular cavity between the exterior of the cylindrical portion 30 and the root ends of the series of ejector blades 38. Each of these plates is such that it can be brought into register completely with one of the apertures 40 or 41 whereby the aperture is closed. The relative spacing of the apertures 43, 44 and 45 is such that when the plate 43 closes the aperture 41, then the other aperture 40 is similarly closed by the plate 45. When on the other hand the plate 43 closes the aperture 40, then the other plate 44 closes the aperture 41. An arm 46 extends from the ring 42 and is connected with a hand-lever 47 arranged at the front side of the container through the intermediary of links and a shaft.

The shaft 32, in addition to carrying the ejecting device consisting of the disc 37 and the ejector blades 38 peripherally mounted thereon carries three blades 48, 49 and 50 (see FIGURES 4 and 6). The blades are spaced axially along the shaft 32, and the blades 49 and 50 are shaped in such a way that when the shaft 32 turns in the intended direction shown by the arrow 39 in FIGURE 6, the material encountered by these blades is not only stirred but is also urged in direction axially of the shaft 32 and towards the apertures 40 and 41. The blade 48 is located at the region of the apertures 40 and 41 and serves to ensure that material is discharged through these apertures. As will be apparent from FIGURES 4 and 5, when the shaft 32 turns, the blade 50 will encounter the downwardly depending end 51 of a leaf spring 52. The latter is clamped to the internal side wall of the upper container part 2 by means of a staple 53 fixed to the container portion 2. A set screw entered in the staple holds the leaf spring 52 in the desired position. The leaf spring has a plate 56 secured thereon, such plate fixedly supporting the lower ends of a series of elongated fingers 57. From the plate 56 the fingers extend upwardly and divergently within the container, and when the shaft 32 is rotating and the blade 50 encountering the end 51 of the leaf spring 52 the fingers move and act as agitators which prevent undesired caking of the material within the container. During the movement of the fingers they contact the inner wall of the container.

As can best be seen from FIGURES 1 and 3, an arcuate baffle plate 54 is mounted on brackets fixed to the upper container part 2. The baffle plate 54 is of a width substantially equal to the width of the tips of the blades 38 and is formed with a series of inwardly turned deflectors 55.

In the employment of the device described above, the device may be mounted upon the three-point power hoist of a tractor. For this purpose, the pins 15 and 16 are connected to the ends of the two lower lift links of the power hoist, and the end of the upper link is secured in the U-bracket 12, 13 and 11. The end 36 of the shaft 32 is now directly connected to the power take-off shaft of the tractor. The material for spreading is loaded into the container 2, 3. At this time the hand-lever 47 is in the position so that the shutter plates 43 and 45 close the apertures 40 and 41 in the manner shown in FIGURE 6. The device may be appropriately raised with the tractor hoist and taken to the side where it is desired to spread the material held in the container thereof. With the aid of the tractor power take-off shaft, the shaft 32 may now be set in rotation in the direction shown by the arrow 39. The hand-lever 47 is now moved so as to bring the shutter plates 43 and 44 into co-operation respectively with the apertures 40 and 41 in such a way that the latter are left either wholly uncovered or covered to a chosen extent. The material in the container can now pass out of the cylindrical mouth portion 30 via the apertures 40 and 41 therein which constitute gated outlet ports. The root ends of the ejector blades now sweep over the outlet ports and receive material therefrom. Under the action of centrifugal force, the material moves towards the tips of the ejector blades and is thrown against and intercepted by the interior of the arcuate baffle 54. The material is discharged from the end of the baffle 54 and from the continuation of the deflecting surface thereof constituted by the deflectors 55. In FIGURE 1 the material being spread is indicated by a series of radiating lines.

As will be apparent from FIGURE 4, if it is desired to remove the ejecting device which includes the blades 38, this may be simply done by removing the collar 34 where upon the shaft 32 can be bodily withdrawn together with the disc 37.

Although it is advantageous to drive the shaft 32 from the power take-off of the tractor, it will be understood that this shaft could be arranged to be driven from any other source of power. It will furthermore be appreciated that the device could have a frame supported on ground wheels so that the device could be towed behind a tractor or other vehicle not possessing a power hoist.

What we claim is:

1. A device for spreading material comprising a container and a frame, said container having an upper part detachably mounted in a lower part, said lower part being fixedly connected to the frame and having an upwardly extending trough-like portion bearing said upper part and a substantially cylindrical horizontal portion, a revolvable shaft extending through and coinciding with the center line of said cylindrical portion, said shaft being supported at one end of said cylindrical portion, the other end of said cylindrical portion having an opening, a disc being provided adjacent said opening perpendicular to said shaft, a plurality of ejector blades mounted on said shaft outside said cylindrical portion for receiving material through outlet apertures near said other end of cylindrical portion and ejecting material, said shaft being provided with blade means for urging material through said cylindrical portion to said ejector blades, an agitator being mounted on the inner wall of the upper part of the container and means being provided on the shaft in said lower part to actuate said agitator.

2. The invention of claim 1 wherein said blade means include a plurality of blades mounted on the shaft and the agitator includes a leaf spring, said spring being agitated by said blades.

3. The invention of claim 1 wherein the agitator includes a plurality of resiliently mounted elongated fingers extending in the upper part of the container.

4. A device for spreading material comprising a container and a frame, said container having an upper part mounted in a lower part, said lower part being fixedly connected to the frame and having an upwardly extending trough-like portion and a substantially horizontal portion, said trough-like portion detachably supporting said upper part, said horizontal portion having openings at either end thereof, a side discharge aperture in said horizontal portion intermediate said openings, a revolvable shaft extending through said openings, at one end the horizontal portion adjoining the trough-like portion and at the other end the revolvable shaft is provided with a disc substantially perpendicular to said shaft, said disc closing the opening at said other end and having a plurality of ejector blades arranged outside said lower part for receiving material from said aperture and ejecting the material, said shaft being provided with at least one blade for urging material through said horizontal portion towards said ejector blades.

References Cited by the Examiner
UNITED STATES PATENTS

| | | | |
|---|---|---|---|
| Re. 554 | 5/58 | Cahoon | 275—8 |
| 58,219 | 9/66 | Coffman | 275—12 |
| 143,211 | 9/73 | Wilson | 275—8 |
| 364,424 | 6/87 | Love | 275—12 |
| 1,166,476 | 1/16 | Parrish | 275—15 |
| 2,490,971 | 12/49 | Lawson et al. | 275—8 |
| 2,958,531 | 11/60 | Stokland | 275—80 |

FOREIGN PATENTS

| | | |
|---|---|---|
| 1,495 | 4/26 | Australia. |
| 345,992 | 3/31 | Great Britain. |
| 730,989 | 6/55 | Great Britain. |

ABRAHAM G. STONE, *Primary Examiner.*
WILLIAM A. SMITH III, *Examiner.*